March 6, 1945. J. E. AUSTIN 2,370,766
HOSE CLAMP
Filed Oct. 30, 1943
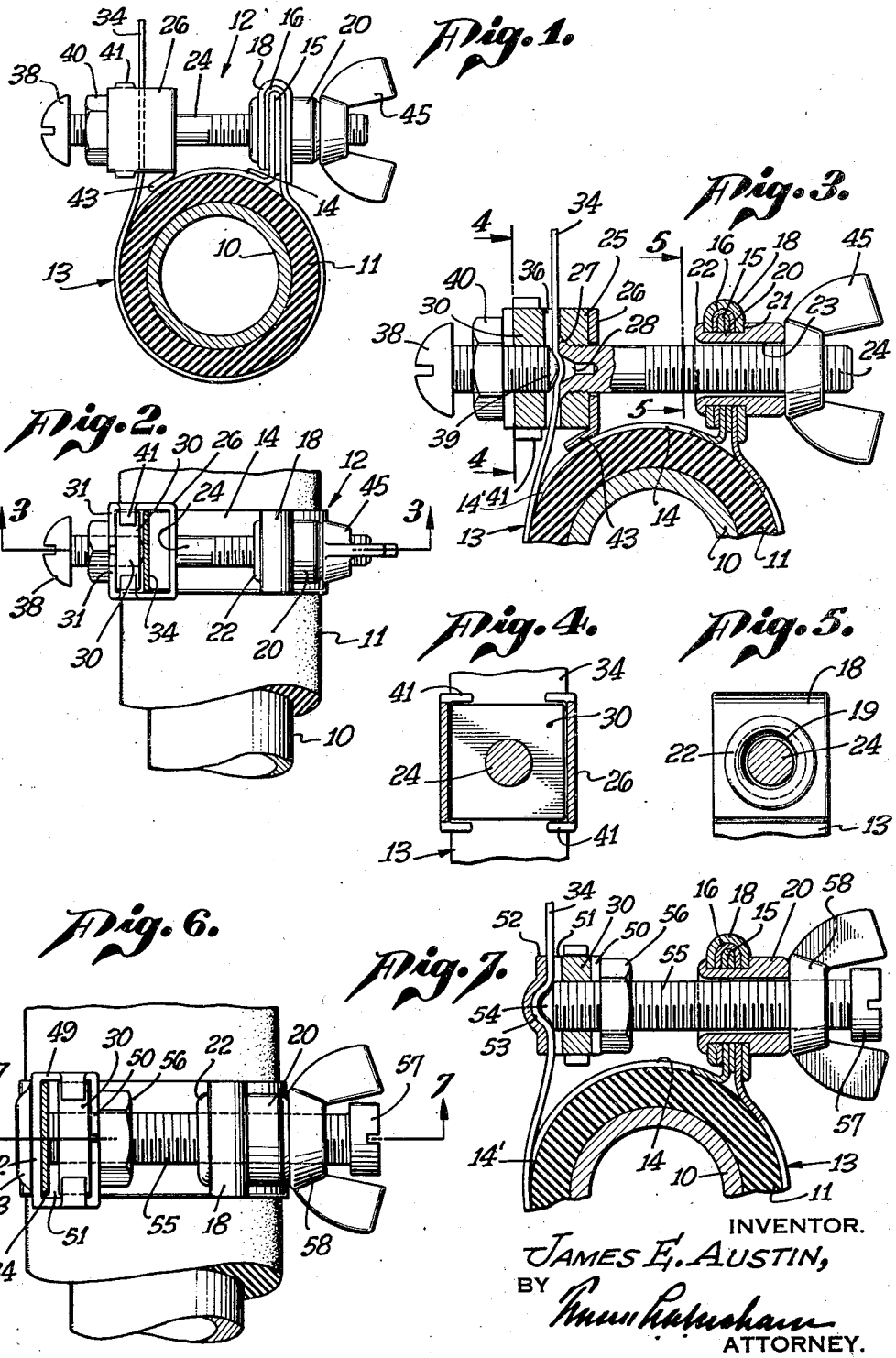
INVENTOR.
JAMES E. AUSTIN,
BY
ATTORNEY.

Patented Mar. 6, 1945

2,370,766

UNITED STATES PATENT OFFICE 2,370,766

HOSE CLAMP

James E. Austin, North Hollywood, Calif.

Application October 30, 1943, Serial No. 508,329

7 Claims. (Cl. 24—19)

This invention relates to improvements in hose clamps, such as are used for clamping a hose to a pipe or conduit.

It is an object of this invention to provide a simple form of clamp which can be placed on a hose at any desired location after the hose has been connected to the pipe or conduit.

Another object of this invention is to produce a hose clamp which can be used on different sizes of hose and adjusted on the hose and removed therefrom at either side of the clamp.

It is another object of the present invention to produce a hose clamp of simple form and construction in which the clamping band is connected to the clamping unit in such a manner that breakage and replacements are reduced to a minimum.

A further object of this invention is to produce a hose clamp of simple form and construction in which a uniform pressure is produced around the hose.

Other objects and advantages will appear hereinafter from the following specification and drawing.

Referring to the drawing, which is for illustrative purposes only,

Figure 1 shows a hose and pipe in section and a preferred form of my hose clamp mounted thereon.

Figure 2 is a plan view of the hose clamp shown in Figure 1, the clamping band being in section.

Figure 3 is an enlarged cross sectional elevational view on line 3—3 of Figure 2.

Figure 4 is a transverse sectional view on line 4—4 of Figure 3.

Figure 5 is a sectional view on line 5—5 of Figure 3.

Figure 6 is an enlarged plan view of a modified form of my hose clamp, the clamping band being shown in section; and Figure 7 is a cross sectional elevational view on line 7—7 of Figure 6.

Referring more particularly to Figures 1 to 5 of the drawing, 10 indicates a pipe having a hose 11 thereon. The hose clamp consists of a clamping unit generally indicated at 12 and a clamping band indicated at 13. Indicated at 14 is a tongue formed of sheet metal, one end of which extends upwardly, and bent back upon itself, as indicated at 15. Bent over the end 15 of the tongue is one end 16 of the band 13. For the purpose of holding the end 15 and the end 16 of the tongue and band respectively is a U-shaped yoke 18. The yoke 18, the end 15 of the tongue 14, and the end 16 of the strip 13 are all provided with an opening 19 (see Fig. 5) which receives a bushing indicated as 20.

The bushing 20 is provided with a shoulder 21 which engages one side of the yoke 18 and is pressed over as indicated at 22 at its inner end against the other side of the yoke 18, thereby firmly clamping the yoke and the ends of the tongue and the clamping band together. The bushing 20 is provided with a longitudinal opening indicated at 23 through which extends a threaded bolt 24. The inner end of the bolt 24 is threaded into a square head indicated at 25, such head being mounted in a cage indicated at 26. The inner end of the bolt 24 is swaged over a recess 27 in the head 25 and thereby securely fastens the head to the bolt.

The inner end of the bolt is recessed as indicated at 28 for the purpose hereinafter described. The cage 26 is formed of metal and extends around a square nut 30, the ends of the cage being bent over the face of the nut as indicated at 31 in Figure 2. The free end 34 of the clamping band 13 extends upwardly through a passage indicated at 36 between the head 25 and the nut 30. Threaded into the nut 30 is a stud indicated at 38. This stud is rounded at its inner end as indicated at 39 and such rounded end engages the free end 34 of the band 13 over the recess 28 in the end of the bolt 24 and upon tightening of the stud 38 the rolled end 39 of the stud presses the band into the recess 28 as clearly shown in Figure 3 and thereby secures the end of the band in the clamping unit. 40 indicates a locking nut on the stud 38 which engages the ends 31 of the cage 26. The cage 26 is provided with ears 41 which extend over opposite faces of the nut 30 and the inner wall of the cage 26 extends downwardly and is provided with a foot 43 which engages the tongue 14 and generally retains the tongue 14 in close engagement with the hose. Threaded on the outer end of the bolt 24 is a butterfly nut indicated at 45. This butterfly nut engages against the outer end of the bushing 21.

The clamp shown in Figures 1 to 5 is used in the following manner: The free end 34 of the clamping band 13 is extended through the passage 36 between the head 25 and the nut 30 and upon the tightening of the stud 38 the end of the bolt presses the band into the recess 28 in the end of the bolt 24, thereby firmly securing the end of the band in the clamp. When so secured the nut 45 may be tightened thereby drawing the band tightly about the hose throughout its entire circumference with the exception of that portion of the hose engaged by the tongue 14, the free end 14' of which extends under the clamping band. It is pointed out that the pull on the end 34 of the clamping band is almost tangential of the hose so that the tightening effect of the band on the hose is substantially the same around the hose, the tongue 14 engaging the hose in that portion of its circumference not engaged by the band 13 insures that the pressure on the hose is evenly distributed around the hose.

A further feature of my clamp is that the free end of the band is not weakened by holes or perforations and when the metal of the band unduly stretches the stud 38 may be loosened and the free end of the band pulled into another position and the stud 38 retightened.

In the form of my invention shown in Figures 6 and 7 the ends of the tongue 14 and one end of the band 13 are secured in the bushing 20 in the same manner as described with respect to the form shown in Figures 1 to 5. However, in Figures 6 and 7 the nut 30 is mounted in a cage indicated at 49. In this case the inner ends of the cage indicated at 50 engage the inner face of the nut 30 and the end 34 of the clamping band extends through a passage 51 formed between the nut 30 and the outer wall 52 of the cage. This outer wall 52 is provided with a recess or depression indicated at 53 into which the free end of the clamping band is deformed by the end 54 of a bolt 55, a locking nut 56 being provided to hold the bolt in proper position as shown in Figure 7. The end of the bolt in this form of my invention is provided with a slotted head 57 and a butterfly lock nut indicated at 58.

In this form of my invention as well as in the form shown in Figures 1 to 5, inclusive, the end of the clamping band extends substantially tangentially of the hose, the end of the tongue extending under the clamping band as indicated at 14'. In both forms shown it will be noted that the free end of the band 13 extends substantially tangentially of the hose and consequently when the bolt 24 or bolt 55, as the case may be, is tightened the pull on the band by the clamping unit is distributed substantially around the surface of the hose engaged by the band and tongue.

It is to be understood that while I have described my clamp as applied to connecting a hose to a pipe, my clamp can readily be used without modification on electric cables and the like.

It is contemplated that various modifications and changes can be made in the invention as shown and described herein without departing from the scope of the invention and it is intended to cover such changes and modifications as come within the scope of the claims.

I claim as my invention:

1. A hose clamp comprising; a flexible clamping band and a clamping unit; means for securing one end of said band in said clamping unit, said band having an imperforate free end extending through said clamping unit; a bolt in said clamping unit having its inner end engageable with the free end of the band; means cooperating with the inner end of the bolt to secure the free end of the band; and means for drawing the ends of the band in the clamping unit together.

2. A hose clamp comprising: a flexible band adaptable to extend around a hose and a clamping unit; a tongue adaptable to engage the hose; means for securing one end of said band and said tongue in said clamping unit, said band having a free end extending through said clamping unit; a bolt in said clamping unit having its inner end engageable with the free end of the band; means cooperating with the inner end of the bolt to secure the free end of the band; and means for drawing the ends of the band in the clamping unit together.

3. A hose clamp comprising: a flexible clamping band and a clamping unit; means for securing one end of said band in said clamping unit and a free end extending through said clamping unit in a line substantially tangential to the periphery of the hose; a bolt in said clamping unit having its inner end engageable with the free end of the band; means cooperating with the inner end of the bolt to secure the free end of the band; and means for drawing the ends of the band in the clamping unit together.

4. In a hose clamp: a flexible band to extend around the hose; a tongue adapted to engage the hose and a clamping unit for the band, said clamping unit comprising a threaded member having a recess in one end; a bushing freely receiving said threaded member; means for securing said flexible band and said tongue to said bushing; means on said clamping unit engageable with a free end of said flexible band to engage the band opposite to the recess in the end of the threaded member; and means for engaging the threaded member to draw the ends of the band toward each other.

5. In a hose clamp: a flexible band to extend partially around the hose; a tongue arranged to engage the portion of the hose unengaged by the band; a bushing; means on the bushing for securing one end of the band and one end of the tongue on said bushing; a bolt extending freely through said bushing; a head fixed on the inner end of said bolt, said bolt having a recess in its inner end; a nut opposite said head spaced apart therefrom to form a passage therebetween to freely receive the free end of the band; a cage extending around said head and said nut to prevent turning thereof; a stud threaded into said nut having its inner end engageable with the band to deform the band into the recess in the end of the bolt; and a nut on the outer end of the bolt engageable with the outer end of the bushing to draw the ends of the band toward each other.

6. In a hose clamp: a flexible band to extend partially around the hose; a tongue arranged to engage the portion of the hose unengaged by the band; a bushing having a reduced portion, said tongue having one end bent upon itself with a bushing receiving opening therethrough, said band having one end bent over the bent end of the tongue and having bushing receiving holes therethrough; a yoke extending over the bent ends of the tongue and band, said yoke having a bushing receiving opening therethrough; a flange formed on the inner end of the bushing engageable with the yoke to secure the ends of the tongue and band on the bushing; a bolt freely extending through the bushing; means opposite the inner end of the bolt for securing the free end of the band and means cooperating with said bolt and bushing for drawing the ends of the band toward each other.

7. In a hose clamp: a flexible band to extend partially around the hose; a tongue arranged to engage the portion of the hose unengaged by the band; a bushing; means on the bushing for securing one end of the band and one end of the tongue on said bushing; a bolt extending freely through said bushing; a head on the inner end of said bolt; a cage; a nut in said cage spaced apart from said nut to form a passage to receive the free end of the band and having a recess therein opposite the end of the bolt whereby, when the bolt is tightened, the free end of the band is secured in the cage with a portion of the band deformed into the recess in the cage; and means on the bolt engageable with the outer end of the bushing to draw the ends of the band toward each other.

JAMES E. AUSTIN.